US007812064B2

(12) United States Patent
Odell et al.

(10) Patent No.: US 7,812,064 B2
(45) Date of Patent: *Oct. 12, 2010

(54) PHASE CHANGE INK COMPOSITIONS

(75) Inventors: Peter G. Odell, Mississauga (CA);
Jennifer L. Belelie, Oakville (CA);
Hadi K. Mahabadi, Mississauga (CA);
Christopher A. Wagner, Toronto (CA);
C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/890,719

(22) Filed: Aug. 7, 2007

(65) Prior Publication Data

US 2009/0038506 A1    Feb. 12, 2009

(51) Int. Cl.
C08F 2/50       (2006.01)
C08J 3/28       (2006.01)
C09D 11/00      (2006.01)
C09D 11/10      (2006.01)

(52) U.S. Cl. ............................. 522/81; 522/71; 522/74; 522/113; 522/114; 522/120; 522/121; 522/109; 522/110; 522/111; 522/112; 522/178; 522/182; 522/908; 427/508; 427/510; 427/511; 427/514; 427/515; 427/517; 106/31.13; 106/31.6

(58) Field of Classification Search .................... 522/71, 522/74, 113, 114, 120, 121, 109, 110, 112, 522/111, 178, 182, 908; 427/508, 510, 511, 427/514, 515 M, 517; 106/31.13, 31.6; 523/160, 523/161

See application file for complete search history.

(56) References Cited

U.S. PATENT DOCUMENTS

| | | | | |
|---|---|---|---|---|
| 3,653,932 | A |  | 4/1972 | Berry et al. .............. 106/31.29 |
| 4,390,369 | A |  | 6/1983 | Merritt et al. .............. 106/31.3 |
| 4,484,948 | A |  | 11/1984 | Merritt et al. .............. 106/31.3 |
| 4,684,956 | A |  | 8/1987 | Ball ............................. 347/88 |
| 4,851,045 | A |  | 7/1989 | Taniguchi ................ 106/31.31 |
| 4,889,560 | A |  | 12/1989 | Jaeger et al. ............ 106/31.29 |
| 4,889,761 | A |  | 12/1989 | Titterington et al. ........ 428/32.1 |
| 5,006,170 | A |  | 4/1991 | Schwarz et al. ............ 106/31.3 |
| 5,151,120 | A |  | 9/1992 | You et al. ................. 106/31.29 |
| 5,195,430 | A |  | 3/1993 | Rise ............................. 100/168 |
| 5,221,335 | A |  | 6/1993 | Williams et al. ............. 524/560 |
| 5,372,852 | A |  | 12/1994 | Titterington et al. ........ 427/288 |
| 5,389,958 | A |  | 2/1995 | Bui et al. ..................... 347/103 |
| 5,496,879 | A |  | 3/1996 | Griebel et al. .............. 524/320 |
| 5,621,022 | A |  | 4/1997 | Jaeger et al. ................. 523/161 |
| 6,239,189 | B1 | * | 5/2001 | Narayan et al. ................ 522/40 |
| 6,547,380 | B2 |  | 4/2003 | Smith et al. ................... 347/96 |
| 6,586,492 | B1 | * | 7/2003 | Caiger et al. .................. 522/75 |
| 6,896,937 | B2 | * | 5/2005 | Woudenberg ............... 427/511 |
| 2007/0120910 | A1 |  | 5/2007 | Odell et al. ..................... 347/88 |
| 2007/0120924 | A1 | * | 5/2007 | Odell et al. ................. 347/100 |
| 2007/0123606 | A1 |  | 5/2007 | Toma et al. .................. 523/160 |
| 2007/0123723 | A1 |  | 5/2007 | Odell et al. ..................... 554/36 |
| 2008/0000384 | A1 | * | 1/2008 | Belelie et al. ............ 106/31.13 |
| 2008/0122914 | A1 | * | 5/2008 | Toma et al. .................. 347/100 |

FOREIGN PATENT DOCUMENTS

| | | |
|---|---|---|
| EP | 0187352 | 7/1986 |
| EP | 0206286 | 12/1986 |
| EP | 1642944 | 5/2006 |
| WO | WO 94/04619 | 3/1994 |
| WO | WO 2007025893 | 8/2007 |

OTHER PUBLICATIONS

U.S. Patent Application filed Nov. 30, 2005, of Peter G. Odell et al., Application Document No. 20070120910, entitled "Phase Change Inks Containing Photoinitiator With Phase Change Properties," U.S. Appl. No. 11/290,202, Published May 31, 2007.

U.S. Patent Application filed Nov. 30, 2005, of Peter G. Odell et al., Aplication Document No. 20070123723, entitled "Photoinitiator with Phase Change Properties and Gellant Affinity," U.S Appl. No. 11/290,207, Published May 31, 2007.

U.S. Patent Application filed Nov. 30, 2005, of Jennifer L. Belelie et al., Application Document No. 20070123724, entitled "Method for Preparing Curable Amide Gellant Compounds," U.S. Appl. No. 11/290,328, Published May 31, 2007.

English Abstract for German Patent Publication DE 4205713AL, Mar. 1996.

Disperbyk-2001 data Sheet W224, 4 pages, from http://www.byk-chemie.com.

Kirk-Othmer Encyclopedia of Chemical Technology, 4th Ed., John Wiley & Sons, NY, vol. 24, pp. 239-240.

U.S. Patent Application filed Nov. 30, 2005, of Eniko Toma et al., Application Document No. 20070123606, entitled "Phase Change Inks Containing Curable Amide Gellant Compounds" U.S. Appl. No. 11/290,121, Published May 31, 2007.

U.S. Patent Application filed Nov. 30, 2005, of Jennifer L. Belelie et al., Application Document No. 20070120925, entitled "Radiation Curable Ink Containing A Curable Wax" U.S. Appl. No. 11/289,615, Published May 31, 2007.

U.S. Patent Application filed Jun. 28, 2006, of Peter G. Odell et al., entitled "Radiation Curable Ink Cntaining Gellant and Radiation Curable Wax," 51 pages, 5 drawing figures, U.S. Appl. No. 11/427,172, not yet published.

European Search Report, European Patent Application No. EP 08162043.7-2102, dated Nov. 7, 2008, 5 pages.

* cited by examiner

*Primary Examiner*—Sanza L McClendon
(74) *Attorney, Agent, or Firm*—Marylou J. Lavoie, Esq. LLC

(57) ABSTRACT

A radiation curable phase change ink comprising a white colorant; a colorant dispersant; and an ink vehicle comprising at least one curable monomer; at least one gellant; optionally at least one photoinitiator; optionally at least one stabilizer; and optionally at least one wax.

22 Claims, No Drawings

PHASE CHANGE INK COMPOSITIONS

Copending Application U.S. Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is totally incorporated herein by reference, discloses a phase change ink comprising a colorant, an initiator, and an ink vehicle, said ink vehicle comprising (a) at least one radically curable monomer compound, and (b) a compound of the formula

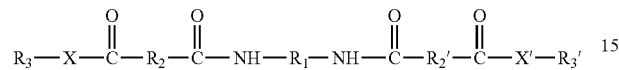

wherein $R_1$ is an alkylene, arylene, arylalkylene, or alkylarylene group, $R_2$ and $R_2'$ each, independently of the other, are alkylene, arylene, arylalkylene, or alkylarylene groups, $R_3$ and $R_3'$ each, independently of the other, are either (a) photoinitiating groups, or (b) groups which are alkyl, aryl, arylalkyl, or alkylaryl groups, provided that at least one of $R_3$ and $R_3'$ is a photoinitiating group, and X and X' each, independently of the other, is an oxygen atom or a group of the formula $-NR_4-$, wherein $R_4$ is a hydrogen atom, an alkyl group, an aryl group, an arylalkyl group, or an alkylaryl group.

Copending Application U.S. Ser. No. 11/290,207, filed Nov. 30, 2005, entitled "Photoinitiator With Phase Change Properties and Gellant Affinity," with the named inventors Peter G. Odell, Eniko Toma, and Jennifer L. Belelie, the disclosure of which is totally incorporated herein by reference, discloses is a compound of the formula

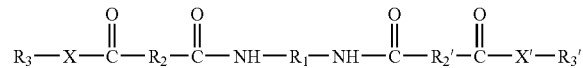

wherein $R_1$ is an alkylene, arylene, arylalkylene, or alkylarylene group, $R_2$ and $R_2'$ each, independently of the other, are alkylene, arylene, arylalkylene, or alkylarylene groups, $R_3$ and $R_3'$ each, independently of the other, are either (a) photoinitiating groups, or (b) groups which are alkyl, aryl, arylalkyl, or alkylaryl groups, provided that at least one of $R_3$ and $R_3'$ is a photoinitiating group, and X and X' each, independently of the other, is an oxygen atom or a group of the formula $-NR_4-$, wherein $R_4$ is a hydrogen atom, an alkyl group, an aryl group, an arylalkyl group, or an alkylaryl group.

Copending Application U.S. Ser. No. 11/290,328, filed Nov. 30, 2005, entitled "Method for Preparing Curable Amide Gellant Compounds," with the named inventors Jennifer L. Belelie, Adela Goredema, Peter G. Odell, and Eniko Toma, and the disclosure of which is totally incorporated herein by reference, discloses a process for preparing a compound of the formula

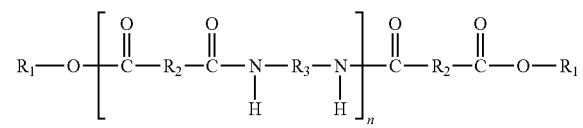

wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups, or alkylarylene groups, and n is an integer representing the number of repeat amide units and is at least 1, said process comprising: (a) reacting a diacid of the formula

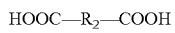

with a diamine of the formula

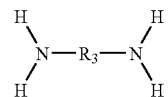

in the absence of a solvent while removing water from the reaction mixture to form an acid-terminated oligoamide intermediate; and (b) reacting the acid-terminated oligoamide intermediate with a monoalcohol of the formula

in the presence of a coupling agent and a catalyst to form the product.

Copending Application U.S. Ser. No. 11/290,121, filed Nov. 30, 2005, entitled "Phase Change Inks Containing Curable Amide Gellant Compounds," with the named inventors Eniko Toma, Jennifer L. Belelie, and Peter G. Odell, the disclosure of which is totally incorporated herein by reference, discloses a phase change ink comprising a colorant, an initiator, and a phase change ink carrier, said carrier comprising at least one radically curable monomer compound and a compound of the formula

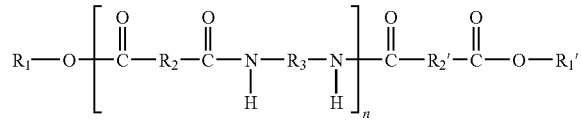

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1. Also disclosed herein is a method of printing with the phase change ink.

Copending Application U.S. Ser. No. 11/427,172, filed Jun. 28, 2006, entitled "Radiation Curable Ink Containing Gellant And Radiation Curable Wax," with the named inventors Peter G. Odell, Eniko Toma, and Jennifer L. Belelie, the disclosure of which is totally incorporated herein by reference, discloses radiation curable phase change ink comprising an ink vehicle that includes at least one curable carrier, at least one gellant, at least one curable wax and at least one photoinitiator. In a method of forming an image with the ink, the radiation curable phase change ink is melted, then jetted onto an image receiving substrate, wherein the radiation curable phase change ink forms a gel state, and exposed to ultraviolet light to cure the curable components of the radiation curable phase change ink. The wax cures into the structure of the ink, thereby generating a robust image of excellent gloss.

Copending Application U.S. Ser. No. 11/289,615, filed Nov. 30, 2005, entitled "Radiation Curable Ink Containing A Curable Wax," with the named inventors Jennifer L. Belelie, et al., the disclosure of which is totally incorporated herein by reference, discloses a radiation curable ink comprising a curable monomer that is liquid at 25° C., curable wax and colorant that together form a radiation curable ink. This ink may be used to form images by providing the radiation curable ink at a first temperature; applying the radiation curable ink to the substrate to form an image, the substrate being at a second temperature, which is below the first temperature; and exposing the radiation curable ink to radiation to cure the ink.

BACKGROUND

The present disclosure is generally related to curable inks, particularly curable phase change white inks, and their use in methods for forming images, particularly their use in ink jet printing. One embodiment disclosed herein comprises a radiation curable phase change ink comprising a white colorant; a colorant dispersant; and an ink vehicle comprising at least one curable monomer; at least one gellant; at least one photoinitiator; optionally at least one stabilizer; and optionally at least one wax.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper.

In these systems, the crystalline wax inks are jetted onto a transfer member, for example, an aluminum drum, at temperatures of approximately 130° C. to about 140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

Radiation curable inks generally comprise a curable monomer, a curable wax, a colorant, and a radiation activated initiator, specifically a photoinitiator, that initiates polymerization of curable components of the ink, specifically of the curable monomer and the curable wax. White radiation curable inks are considered a high value added material for printers. White inks are required for certain graphic and labeling applications. They are most typically used on transparent and dark substrates to compliment or provide a background to text or graphics. White text on smoke colored plastic is particularly striking. White colorants are pigments, which can comprise a variety of materials, most typically titanium dioxide. A general description of titanium dioxide properties can be found, for example, in Kirk-Othmer Encyclopedia of Chemical Technology, 4$^{th}$ Ed., (John Wiley & Sons, NY), Vol. 24, pages 239-240, which is hereby incorporated by reference herein. Because white is produced by light scattering, a pigment having a volume average particle size of from about 200 to about 300 nanometers is generally selected to provide a good white. As the particle size in a dispersion decreases below this range, the dispersion selectively scatters blue light and appears bluish white. As the particle size decreases further, it will not scatter visible light and will become transparent. For example, smaller nanometer sized titanium dioxide pigments are known, but they are colorless. In embodiments herein, an effective white, light scattering is achieved by selecting optimally sized titanium dioxide particles and increased pigment loadings of approximately about 5 to about 30 volume percent based upon the total volume of the cured ink layer. In further embodiments herein, an effective white, light scattering is achieved by selecting optimally sized titanium dioxide particles and increased pigment loadings of approximately about 10 volume percent based upon the total volume of the cured ink layer. The weight percent of a 10 volume percent loading is effectively about 40 percent due to the high density of the titanium dioxide particles relative to the curable vehicle. The combination of dense dispersions, for example, from about 2 to about 4 grams of pigment per milliliter of pigment and dispersion, relatively large size, and high loadings of pigment make it particularly challenging to design a storage stable and jettable white curable ink. Additionally curing is often difficult to accomplish due to high pigment loading and high scattering light required for initiation.

While known compositions and processes are suitable for their intended purposes, a need remains for phase change inks that are suitable for ink jet printing processes, such as piezoelectric ink jet processes and the like. In addition, a need remains for phase change inks that are suitable for acoustic ink jet printing processes. Further, a need remains for improved curable phase change inks, for example for radiation curable phase change white inks with improved storage stability, low Newtonian viscosity, and that cure well.

The appropriate components and process aspects of the each of the foregoing may be selected for the present disclosure in embodiments thereof.

SUMMARY

The present disclosure is directed to a radiation curable phase change ink comprising a white colorant; a colorant dispersant; and an ink vehicle comprising at least one curable monomer; at least one gellant; optionally at least one photoinitiator; optionally at least one stabilizer; and optionally at least one wax.

A process which comprises (I) incorporating into an ink jet printing apparatus radiation curable phase change ink comprising a white colorant; a colorant dispersant; and an ink vehicle comprising at least one curable monomer; at least one gellant; optionally at least one photoinitiator; optionally at least one stabilizer; and optionally at least one wax; (II) melting the ink; (III) causing droplets of the melted ink to be ejected in an imagewise pattern onto a substrate; and (IV) exposing the imagewise pattern to ultraviolet radiation.

DETAILED DESCRIPTION

The present disclosure is directed to a radiation curable phase change ink comprising a white colorant; a colorant dispersant; and an ink vehicle comprising at least one curable monomer; at least one gellant; at least one photoinitiator; optionally at least one stabilizer; and optionally at least one wax.

Any desired or effective white colorant can be employed in the phase change white ink compositions herein, including dyes, pigments, mixtures thereof, and the like, provided that the colorant can be dissolved or dispersed in the ink vehicle.

In embodiments herein, the white colorant is a white pigment selected from titanium dioxide, zinc oxide, zinc sulfide, calcium carbonate, clay, lithopone (a mixture of barium sulphate and zinc sulfide), or mixtures or combinations thereof. In a specific embodiment, the white colorant is a titanium dioxide pigment. Commercial grades of $TiO_2$ are designed with additional artifacts to enhance optical properties such as tint strength and undertone and to promote dispersion stability. The pigment features include size, degree of coating with silica and or alumina, as well as optional organic materials. Illustrative examples of suitable titanium oxide pigments include pigments selected from Ti-Pure® R-108, Ti-Pure® R-104, Ti-Pure® R-103, Ti-Pure® R-102, Ti-Pure® R-700, Ti-Pure® R-706, Ti-Pure® R-760, Ti-Pure® R-900, Ti-Pure® R-960, available from DuPont Titanium Technologies, Wilmington, Del., 2020®, 2063®, 2090®, 2310®, 2450® available from Kronos Ins., Cranbury, N.J., and Tiona® 595, Tiona® 568, Tiona® RCL-6, Tiona® RCL-9, and Tiona® 696 available from Millennium Inorganic Chemicals, Hunt Valley, Md.

In embodiments, pigments selected herein can have a volume average particle size (diameter) of from about 150 to about 450 nanometers, or from about 200 to about 300 nanometers. In one embodiment, the white colorant is a titanium dioxide pigment having a particle size of from about 200 to about 300 nanometers.

The white colorant is present in the ink in any desired or effective amount, in embodiments the white colorant is present in an amount of from about 1 to about 60 percent by weight based upon the total weight of the ink, or from about 20 to about 40 percent by weight based upon the total weight of the ink. In one embodiment, the white colorant is a white pigment present in the ink an amount of about 1 to about 60 percent by weight based upon the total weight of the ink, or from about 20 to about 40 percent by weight based upon the total weight of the ink, or about 10 percent by weight based upon the total weight of the ink.

The white colorant can be dispersed in a dispersant comprising any desirable or effective dispersant. In embodiments, suitable dispersants include copolymers and block copolymers, in embodiments copolymers and block copolymers containing pigment affinic groups, such as amines, esters, alcohols and carboxylic acids. Illustrative examples of suitable dispersants include dispersants selected from Efka® 4008, Efka® 4009, Efka® 4047, Efka® 4520, Efka® 4010, Efka® 4015, Efka® 4020, Efka® 4050, Efka® 4055, Efka® 4080, Efka® 4300, Efka® 4330, Efka® 4400, Efka® 4401, Efka® 4403, Efka® 4406, Efka® 4800, all available from Ciba Specialty Chemicals, Tarrytown, N.Y., Disperbyk® 101, Disperbyk® 102, Disperbyk® 107, Disperbyk® 108, Disperbyk® 109, Disperbyk® 110, Disperbyk® 111, Disperbyk® 112, Disperbyk® 115, Disperbyk® 162, Disperbyk® 163, Disperbyk® 164, Disperbyk® 2001, all available from BYK Additives & Instruments, Wesel Germany, Solsperse® 24000 SC/GR, Solsperse® 26000, Solsperse® 32000, Solsperse® 36000, Solsperse® 39000, Solsperse® 41000, Solsperse® 71000 all available from Lubrizol Advanced Materials, Inc. Cleveland, Ohio or mixtures or combinations thereof. In embodiments, the dispersant comprises Disperbyk® 2001, a brand of industrial copolymer comprising a modified acrylate block copolymer. For example, in embodiments, typical properties for Disperbyk® 2001 include an amine value of about 29 milligrams KOH/gram, an acid value of about 19 milligrams KOH per gram, a density at 20° C. of about 1.03 grams per milliliter, about 46.0 percent non-volatile matter, a flash point of about 35° C., and solvent system comprising methoxypropylacetate/butylglycol/methoxypropanol in a 2/2/1 ratio. See Disperbyk® 2001 Data Sheet W224, 4 pages, available at http://www.byk-chemie.com, which is hereby incorporated by reference herein.

Optionally synergists may be used in conjunction with the dispersant. Illustrative examples of suitable synergists include, but are not limited to, Solsperse® 22000 and Solsperse® 5000.

The dispersant is provided in any desired or effective amount. In embodiments, the dispersant is provided in an amount of from about 0.5 to about 50, or from about 0.5 to about 12, or from about 0.8 to about 8 weight percent relative to the weight of the pigment.

The ink vehicles disclosed herein can comprise any suitable curable monomer. Examples of suitable materials include radically curable monomer compounds, such as acrylate and methacrylate monomer compounds, which are suitable for use as phase change ink carriers. Specific examples of acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, alkoxylated lauryl acrylate, ethoxylated nonyl phenol acrylate, ethoxylated nonyl phenol methacrylate, ethoxylated hydroxyethyl methacrylate, methoxy polyethylene glycol monoacrylate, methoxy polyethylene glycol monomethacrylate, tetrahydrofurfuryl methacrylate, tetrahydrofurfuryl methacrylate and the like, as well as mixtures or combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate, hexanediol diacrylate, tripropylene glycol diacrylate, dipropylene glycol diacrylate, ethoxylated bisphenol A diacrylate, ethoxylated bisphenol A dimethacrylate, alkoxylated hexanediol diacrylate, alkoxylated cyclohexane dimethanol diacrylate, polyethylene glycol diacrylate, polyethylene glycol dimethacrylate, tris(2-hydroxy ethyl)isocyanurate triacrylate, SR9012® a brand of trifunctional acrylate ester available from Sartomer Co. Inc, amine modified polyether acrylates (available as PO 83 F®, LR 8869®, and/or LR 8889® (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 98 percent by weight of the carrier, and in another embodiment no more than about 75 percent by weight of the carrier, although the amount of diluent can be outside of these ranges.

The ink vehicles contain at least one compound that can exhibit gel-like behavior in that they undergo a relatively sharp increase in viscosity over a relatively narrow temperature range when dissolved in a liquid such as those compounds that behave as curable monomers when exposed to radiation such as ultraviolet light. One example of such a curable liquid monomer is a propoxylated neopentyl glycol diacrylate. In one embodiment, some vehicles as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and vehicles that do not undergo changes within these ranges are also included herein.

Any suitable gellant can be used for the ink vehicles disclosed herein. In embodiments, the gellant is a free radical curable gellant.

The gellant can be selected from materials disclosed in copending Application U.S. Ser. No. 11/290,207, filed Nov. 30, 2005, entitled "Photoinitiator With Phase Change Properties and Gellant Affinity," with the named inventors Peter G. Odell, Eniko Toma, and Jennifer L. Belelie, the disclosure of which is totally incorporated herein by reference, such as a compound of the formula

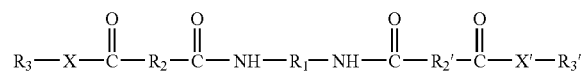

wherein:

$R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 12 carbon atoms, in another embodiment with no more than about 4 carbon atoms, and in yet another embodiment with no more than about 2 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 6 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 54 carbon atoms, and in another embodiment with no more than about 36 carbon atoms, although the number of carbon atoms can be outside of these ranges, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 7 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 8 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to)

halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

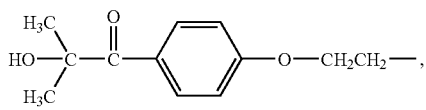

groups derived from 1-hydroxycyclohexylphenylketone, of the formula

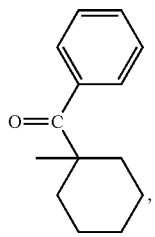

groups derived from 2-hydroxy-2-methyl-1-phenylpropan-1-one, of the formula

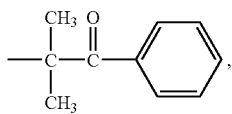

groups derived from N,N-dimethylethanolamine or N,N-dimethylethylenediamine, of the formula

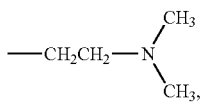

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

provided that at least one of $R_3$ and $R_3'$ is a photoinitiating group;

and X and X' each, independently of the other, is an oxygen atom or a group of the formula —$NR_4$—, wherein $R_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, in one embodiment with at least 1 carbon atom, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iii) an aryl group, including substituted and unsubstituted aryl groups, and wherein heteroatoms either may or may not be present in the aryl group, in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. In embodiments, the radiation curable phase change ink herein comprises a radiation curable wax and a gellant as described above.

Examples of photoinitiators used herein include (but are not limited to) benzophenone derivatives, benzyl ketones, monomeric hydroxyl ketones, polymeric hydroxyl ketones, α-amino ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from Ciba, isopropyl thioxanthenones, arylsulphonium salts and aryl iodonium salts and the like, and mixtures and combinations thereof. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl)phosphine oxide, benzyl-dimethylketal, isopropylthioxanthone, 2,4,6-trimethylbenzoyldiphenylphosphine oxide (available as BASF LUCIRIN TPO®), 2,4,6-trimethylbenzoylethoxyphenylphosphine oxide (available as BASF LUCIRIN TPO-L®), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino 1-(4-morpholinophenyl)butanone-1 (available as Ciba IRGACURE® 369), 2-hydroxy-1-(4-(4-(2-hydroxy-2-methylpropionyl)-benzyl)-phenyl)-2-methylpropan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, benzyl-dimethylketal, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

The initiator can be present in the ink in any desired or effective amount, in one embodiment at least about 0.5 percent by weight of the ink, and in another embodiment at least about 1 percent by weight of the ink, and in one embodiment no more than about 15 percent by weight of the ink, and in another embodiment no more than about 10 percent by weight of the ink, although the amount can be outside of these ranges.

The radiation curable phase change white inks herein can also optionally contain an antioxidant or stabilizer. The optional antioxidants can protect the images from oxidation and can also protect the ink components from oxidation during the heating portion of the ink preparation process. Specific examples of suitable antioxidant stabilizers include (but are not limited to) NAUGARD® 524, NAUGARD® 635, NAUGARD® A, NAUGARD® I-403, and NAUGARD® 959, commercially available from Crompton Corporation, Middlebury, Conn.; IRGANOX® 1010 and IRGASTAB® UV 10, commercially available from Ciba Specialty Chemicals; GENORAD 16 and GENORAD 40 commercially available from Rahn A G, Zurich, Switzerland, and the like, as well as mixtures thereof. When present, the optional antioxidant is present in the ink in any desired or effective amount, in one embodiment at least about 0.01 percent by weight of the ink carrier, in another embodiment at least about 0.1 percent by weight of the ink carrier, and in yet another embodiment at least about 1 percent by weight of the ink carrier, and in one embodiment no more than about 20 percent by weight of the ink carrier, in another embodiment no more than about 5 percent by weight of the ink carrier, and in yet another embodiment no more than about 3 percent by weight of the ink carrier, although the amount can be outside of these ranges.

The radiation curable phase change inks can also, if desired, contain additives to take advantage of the known functionality associated with such additives. Such additives may include, for example, defoamers, slip and leveling agents, pigment dispersants, and the like, as well as mixtures thereof. The inks can also include additional monomeric or polymeric materials as desired.

In one embodiment, the radiation curable phase change white inks herein can include a wax, in another embodiment, a wax curable by free radical polymerization, in another embodiment a wax curable by ultra-violet radiation initiated polymerization, in still another embodiment, a free radical curable wax, in another embodiment, a radiation curable wax containing at least one acrylate group. In another embodiment, the radiation curable phase change white inks herein can include a radiation curable wax and the at least one gellant, for example, in embodiments, a gellant comprising a compound of the formula described herein.

Curing of the ink can be effected by exposure of the ink image to actinic radiation at any desired or effective wavelength, in one embodiment at least about 200 nanometers, and one embodiment no more than about 480 nanometers, although the wavelength can be outside of these ranges. Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like. The curing of the ink can also be accomplished in the absence of photoinitiators by electron beam radiation.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, in another embodiment, of greater than about $10^5$ centipoise at a temperature of less than about 40° C., in another embodiment, of less than about 15 centipoise at a temperature of no less than about 70° C., although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges. At such low jetting temperatures, the conventional use of temperature differential between the jetted ink and the substrate upon which the ink is jetted to effect a rapid phase change in the ink (i.e., from liquid to solid) may not be effective. The gellant can thus be used to effect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

In some embodiments, the temperature at which the ink forms the gel state is any temperature below the jetting temperature of the ink, in one embodiment any temperature that is about 5° C. or more below the jetting temperature of the ink. In one embodiment, the gel state can be formed at a temperature of at least about 25° C., and in another embodiment at a temperature of at least about 30° C., and in one embodiment of no more than about 100° C., in another embodiment of no more than about 70° C., and in yet another embodiment of no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{2.5}$-fold increase in viscosity.

It has been found that optimum transfer efficiency from an intermediate transfer surface to a final recording sheet and optimum print quality can be achieved if the viscosity of the ink image deposited on the intermediate transfer member is greatly increased after jetting the ink, so as to obtain a stable and transferable image that will not smear. A suitable gelling agent for the ink will gel the monomers/oligomers in the ink vehicle quickly and reversibly and will demonstrate a narrow phase change transition, for example within a temperature range of from about 30° C. to about 100° C. or from about 30° C. to about 70° C., although the transition range can be outside of these temperature ranges. The gel state of the ink in one specific embodiment exhibits a minimum of $10^{2.5}$ centipoise, and in another specific embodiment $10^3$ centipoise, increase in viscosity at transferring temperatures, e.g., in one specific embodiment from about 30° C. to about 70° C., compared to the viscosity at the jetting temperature. One specific embodiment is directed to gellant containing inks that rapidly increase in viscosity within from about 5° C. to about 10° C. below the jetting temperature and ultimately reach a viscosity above $10^4$ times the jetting viscosity, and in another embodiment about $10^5$ times the jetting viscosity, although the viscosity can be outside of these ranges.

When the inks are in the gel state, the viscosity of the ink is in one embodiment at least about 1,000 centipoise, in another embodiment at least about 10,000 centipoise, and in yet another embodiment at least about 100,000 centipoise, although the viscosity can be outside of these ranges. Viscosity values in the gel state are in one embodiment at least about $10^3$ centipoise, and in another embodiment at least about $10^{4.5}$ centipoise, and in one embodiment no more than about $10^9$ centipoise, and in another embodiment no more than about $10^{6.5}$ centipoise, although the gel state viscosity can be outside of these ranges. The preferred gel phase viscosity can vary with the print process. For example, the highest viscosities are preferred when employing intermediate transfer, or when jetting directly to porous paper in order to minimize the effects of ink bleed and feathering. On the other hand, less porous substrates such as plastic may lead to the use of lower ink viscosities that control dot gain and agglomeration of individual ink pixels. The gel viscosity can be controlled by ink formulation and substrate temperature. An additional benefit of the gel state for radiation curable inks is that higher viscosities of about $10^3$ to about $10^4$ centipoise can reduce oxygen diffusion in the ink, which in turn can lead to a faster rate of cure in free radical initiation.

For printing applications wherein the ink is printed onto an intermediate transfer member and subsequently transferred to a final substrate, the viscosity of the ink in one specific embodiment increases to about $10^6$ centipoise or greater at the intermediate transfer member temperature to facilitate adhesion to the intermediate transfer member, and for printing applications wherein the ink is printed directly onto a final substrate, the viscosity of the ink in one specific embodiment increases to $10^6$ centipoise or greater at the final substrate temperature to prevent the ink from soaking into the final substrate and/or to facilitate adhesion to the final substrate until curing by exposure to radiation. In one specific embodiment, the temperature of the intermediate transfer member or the final substrate onto which the ink is printed and at which the ink viscosity increases to about $10^6$ centipoise or greater is about 70° C. or lower.

In one specific embodiment herein, the ink has a viscosity of greater than about $10^4$ to about $10^7$ centipoise at a temperature range of from about 15° C. to about 50° C. In another embodiment, the ink has a viscosity of greater than about $10^5$ centipoise at a temperature of less than about 40° C. In another embodiment, the ink has a viscosity of greater than about $10^6$ centipoise at a temperature of less than about 40° C. In yet another embodiment, the ink has a viscosity of greater than about 2 to about 22 centipoise at a temperature range of from about 70° C. to about 95° C. In still another embodiment, the ink has a viscosity of less than about 15 centipoise at a temperature of greater than about 70° C.

The ink compositions can be prepared by any desired or suitable method. For example, the ink ingredients can be mixed together, followed by heating, to a temperature in one embodiment of at least about 80° C., and in one embodiment of no more than about 120° C., although the temperature can be outside of these ranges, and stirring until a homogeneous ink composition is obtained, followed by cooling the ink to ambient temperature (typically from about 20° C. to about 25° C.). The inks are solid at ambient temperature.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4200 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, ceramics, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Two inks were prepared having the compositions set forth in Table 1. The initial dispersion was prepared by combining about 0.2 grams of Disperbyk® 2001 (modified acrylate block copolymer available from BYK-Chemie) with about 15.8 grams SR-9003® (propoxylated (2) neopentyl glycol diacrylate monomer available from Sartomer Company), and about 4.0 grams of Dupont® R-103 titanium dioxide pigment. The resulting suspension was allowed to rest overnight to allow the pigment to become wetted. The pigment suspension was then mixed with a rotor stator mixer for about 30 seconds at about 300 rpm and then the pigment dispersion was aged for eight days. After eight days, the dispersion showed little perceptible separation, but was redispersed using an ultrasonic probe at full power for about 300 seconds. Again the stability of the dispersion was assessed for a week. After one week, the pigment dispersion remained well dispersed and was combined with about 0.2 grams of Irgastab® UV10 (radical scavenger available from Ciba® Specialty Chemicals, Inc.) and heated at about 90° C. for about three hours with no deleterious effects. This dispersion was then made into a full gel ink and wax gel ink having the compositions set forth in Table 1.

TABLE 1

| Component | Ink Example #, wt % | | | |
|---|---|---|---|---|
| | 1 | 2 | 3 | 4 |
| SR-9003 ® | 24.8 | 29.8 | 29.9 | 35.9 |
| amide gellant | 7.5 | 7.5 | 7.5 | 7.5 |
| Unilin ® 350-acrylate | 5 | 0 | 0 | 0 |
| Irgacure ® 184 | 5 | 5 | 5 | 5 |

TABLE 1-continued

| Component | Ink Example #, wt % | | | |
|---|---|---|---|---|
| | 1 | 2 | 3 | 4 |
| Irgacure ® 819 | 1.5 | 1.5 | 1.5 | 1.5 |
| Darocur ® ITX | 2 | 2 | 2 | 0 |
| Darocur ® EDB (ethyl-4-dimethylamino benzoate) | 5 | 5 | 5 | 0 |
| TiO$_2$ pigment dispersion, 20 wt %* | 49 | 49 | 0 | 0 |
| TiO$_2$ pigment dispersion, 40 wt %** | 0 | 0 | 49 | 50 |
| Disperbyk ® 2001 | | | 0.1 | 0.1 |
| Irgastab ® UV10 | 0.2 | 0.2 | 0 | 0 |
| | 100 | 100 | 100 | 100 |

*pigment dispersion = SR9003 (79%), Disperbyk 2001 (1%), R103 TiO2 (20%)
**pigment dispersion = SR9003 (59%), Disperbyk 2001 (1%), R103 TiO2 (40%)

The rheological profiles for the ink examples 1-4 are provided in the Tables 2-9 below. According to the rheological profiles, all of these inks are jettable (that is, have a viscosity of about 10 cps) at or below 90° C. The rheological characteristics of the inks were obtained by testing with a Rheometrics® Fluid Spectrometer RFS3. As is known to one of ordinary skill in the art, temperature step is a rheology measurement at discrete temperatures across a range of temperatures. Ratesweep is a rheological measurement at a single temperature but with varying shear rates. G' is the storage modulus and G" is the loss modulus. Tan delta is G" divided by G'. A temperature sweep from 90° C. to 30° C. at 1 Hz sweep rate was conducted with measurements every five or ten degrees. The wax-gellant ink required more energy to effectively stabilize the rheology and this was accomplished with an ultrasonic probe (full power, 15 s, 10 g scale).

TABLE 2

Example 1 Temperature = 90° C.

| rate (s-1) | shear viscosity (cps) |
|---|---|
| 1 | 5.8117 |
| 1.5849 | 5.0086 |
| 2.5119 | 4.6296 |
| 3.9811 | 5.0871 |
| 6.3096 | 4.3749 |
| 10 | 4.4255 |
| 15.849 | 4.2014 |
| 25.119 | 4.2078 |
| 39.811 | 4.1917 |
| 63.096 | 4.2281 |
| 100 | 4.1975 |
| 158.49 | 4.2083 |
| 251.19 | 4.1819 |
| 398.11 | 4.1691 |
| 630.96 | 4.2597 |
| 630.96 | 4.2901 |
| 398.11 | 4.2119 |
| 251.19 | 4.2136 |
| 158.49 | 4.232 |
| 100 | 4.2347 |
| 63.096 | 4.2242 |
| 39.811 | 4.2571 |
| 25.119 | 4.2998 |
| 15.849 | 4.2908 |
| 10 | 4.5612 |
| 6.3096 | 4.1723 |
| 3.9811 | 4.3967 |
| 2.5119 | 4.1241 |
| 1.5849 | 4.5286 |
| 1 | 4.3694 |

TABLE 3

Example 1
Temperature step

| temp (° C.) | complex viscosity (cps) | G' (Pa) | G" (Pa) | tan delta |
|---|---|---|---|---|
| 90.002 | 5.5649 | 0.018767 | 0.029502 | 1.572 |
| 85.004 | 5.9067 | 0.014059 | 0.034347 | 2.4431 |
| 80 | 6.6806 | 0.01637 | 0.038652 | 2.3611 |
| 74.995 | 8.6649 | 0.031024 | 0.044739 | 1.4421 |
| 69.999 | 8.6782 | 0.019898 | 0.050766 | 2.5513 |
| 64.999 | 975.51 | 3.7332 | 4.8612 | 1.3021 |
| 60.002 | 29944 | 170.09 | 80.425 | 0.47284 |
| 55.002 | 1.55E+05 | 922.49 | 313.09 | 0.3394 |
| 50.002 | 4.23E+05 | 2571.7 | 660.69 | 0.2569 |
| 44.997 | 8.34E+05 | 5144.1 | 1011.7 | 0.19667 |
| 39.997 | 1.42E+06 | 8833.4 | 1362 | 0.15418 |
| 35.006 | 2.17E+06 | 13543 | 1702.6 | 0.12572 |
| 29.998 | 3.04E+06 | 18988 | 2093.8 | 0.11027 |

TABLE 4

Example 2
Ratesweep Temperature = 90° C.

| rate (s-1) | shear viscosity (cps) |
|---|---|
| 1 | 3.8909 |
| 1.5849 | 3.9643 |
| 2.5119 | 3.622 |
| 3.9811 | 4.15 |
| 6.3096 | 4.2611 |
| 10 | 4.2898 |
| 15.849 | 4.258 |
| 25.119 | 4.373 |
| 39.811 | 4.408 |
| 63.096 | 4.4289 |
| 100 | 4.4362 |
| 158.49 | 4.4234 |
| 251.19 | 4.418 |
| 398.11 | 4.4183 |
| 630.96 | 4.4236 |
| 630.96 | 4.4384 |
| 398.11 | 4.4207 |
| 251.19 | 4.4286 |
| 158.49 | 4.4418 |
| 100 | 4.4647 |
| 63.096 | 4.4803 |
| 39.811 | 4.4964 |
| 25.119 | 4.4893 |
| 15.849 | 4.48 |
| 10 | 4.4834 |
| 6.3096 | 4.4511 |
| 3.9811 | 4.4247 |
| 2.5119 | 4.4847 |
| 1.5849 | 4.3692 |
| 1 | 4.4847 |

TABLE 5

Example 2
Temperature step

| temp (° C.) | complex viscosity (cps) | G' (Pa) | G" (Pa) | tan delta |
|---|---|---|---|---|
| 89.998 | 4.6319 | 0.004491 | 0.028755 | 6.4028 |
| 84.999 | 4.9961 | 0.003639 | 0.03118 | 8.5687 |
| 80.002 | 5.7468 | 0.003606 | 0.035928 | 9.9633 |
| 74.995 | 6.6157 | 0.004312 | 0.041344 | 9.5891 |
| 69.998 | 15.869 | 0.053366 | 0.084225 | 1.5782 |
| 65 | 2626 | 8.8327 | 13.936 | 1.5778 |
| 60 | 62001 | 335.68 | 197.69 | 0.58892 |
| 55.001 | 2.39E+05 | 1386.5 | 579.32 | 0.41783 |
| 50.002 | 4.29E+05 | 2508.2 | 993.46 | 0.39609 |
| 44.996 | 6.76E+05 | 4012.5 | 1388.7 | 0.3461 |
| 39.967 | 1.00E+06 | 6005 | 1859 | 0.30957 |
| 35.033 | 1.35E+06 | 8168 | 2314.9 | 0.28342 |
| 30.046 | 1.74E+06 | 10518 | 2912.9 | 0.27694 |

TABLE 6

Example 3
rate sweep Temperature = 90° C.

| rate (s-1) | shear viscosity (cps) |
|---|---|
| 1 | 4.7626 |
| 1.5849 | 5.273 |
| 2.5119 | 5.308 |
| 3.9811 | 4.962 |
| 6.3096 | 5.212 |
| 10 | 5.2914 |
| 15.849 | 5.18 |
| 25.119 | 5.2278 |
| 39.811 | 5.1995 |
| 63.096 | 5.2048 |
| 100 | 5.1866 |
| 158.49 | 5.177 |
| 251.19 | 5.1535 |
| 398.11 | 5.1389 |
| 630.96 | 5.1999 |
| 630.96 | 5.2269 |
| 398.11 | 5.1728 |
| 251.19 | 5.1906 |
| 158.49 | 5.2098 |
| 100 | 5.2446 |
| 63.096 | 5.2569 |
| 39.811 | 5.2949 |
| 25.119 | 5.299 |
| 15.849 | 5.3024 |
| 10 | 5.2971 |
| 6.3096 | 5.2676 |
| 3.9811 | 5.3248 |
| 2.5119 | 5.1637 |
| 1.5849 | 5.0736 |
| 1 | 5.0508 |

TABLE 7

Example 3
Temperature step

| temp (° C.) | comp viscosity (cps) | G' (Pa) | G" (Pa) | tan delta |
|---|---|---|---|---|
| 90.003 | 5.7494 | 0.005022 | 0.035774 | 7.1238 |
| 84.996 | 5.99 | 0.003317 | 0.03749 | 11.304 |
| 80 | 6.9684 | 0.006527 | 0.043295 | 6.6335 |
| 74.999 | 8.0146 | 0.005483 | 0.050058 | 9.1298 |
| 70 | 9.0392 | 0.004357 | 0.056627 | 12.996 |

TABLE 7-continued

Example 3
Temperature step

| temp (° C.) | comp viscosity (cps) | G' (Pa) | G" (Pa) | tan delta |
|---|---|---|---|---|
| 65.003 | 10.327 | 0.00944 | 0.064197 | 6.8002 |
| 60 | 9461.3 | 58.858 | 8.3449 | 0.14178 |
| 54.999 | 1.90E+05 | 1187.5 | 118.44 | 0.099733 |
| 50.001 | 4.68E+05 | 2932.7 | 210.17 | 0.071665 |
| 45.009 | 9.44E+05 | 5924.3 | 301.76 | 0.050937 |
| 40.015 | 1.61E+06 | 10131 | 357.16 | 0.035253 |
| 34.999 | 2.51E+06 | 15768 | 413.38 | 0.026217 |
| 29.985 | 3.58E+06 | 22504 | 846.7 | 0.037625 |

TABLE 8

Example 4
Ratesweep Temperature = 90° C.

| rate (s-1) | shear viscosity (cps) |
|---|---|
| 1 | 5.1938 |
| 1.5849 | 5.105 |
| 2.5119 | 5.5986 |
| 3.9811 | 5.4217 |
| 6.3096 | 5.3029 |
| 10 | 5.2365 |
| 15.849 | 5.2211 |
| 25.119 | 5.2427 |
| 39.811 | 5.2478 |
| 63.096 | 5.2503 |
| 100 | 5.2491 |
| 158.49 | 5.2287 |
| 251.19 | 5.2137 |
| 398.11 | 5.1682 |
| 630.96 | 5.2193 |
| 630.96 | 5.2313 |
| 398.11 | 5.1804 |
| 251.19 | 5.1881 |
| 158.49 | 5.2139 |
| 100 | 5.271 |
| 63.096 | 5.2932 |
| 39.811 | 5.3096 |
| 25.119 | 5.2913 |
| 15.849 | 5.195 |
| 10 | 5.3258 |
| 6.3096 | 5.0266 |
| 3.9811 | 5.3723 |
| 2.5119 | 5.4845 |
| 1.5849 | 5.4407 |
| 1 | 5.4687 |

TABLE 9

Example 4
temperature step

| temp (° C.) | comp viscosity (cps) | G' (Pa) | G" (Pa) | tan delta |
|---|---|---|---|---|
| 89.998 | 5.6242 | 0.005312 | 0.034936 | 6.5773 |
| 84.998 | 6.1119 | 0.004739 | 0.038109 | 8.0411 |
| 80.001 | 7.1087 | 0.005934 | 0.04427 | 7.4599 |
| 74.997 | 8.102 | 0.007818 | 0.050302 | 6.4343 |
| 70 | 9.4199 | 0.00573 | 0.058909 | 10.282 |
| 65 | 586.82 | 0.55648 | 3.6449 | 6.5499 |
| 60.001 | 11578 | 63.334 | 35.788 | 0.56507 |
| 55.001 | 7.05E+04 | 382.4 | 222.99 | 0.58313 |
| 49.998 | 2.11E+05 | 1094.8 | 750.98 | 0.68595 |
| 45.007 | 4.06E+05 | 2139.7 | 1386.6 | 0.64804 |

TABLE 9-continued

Example 4
temperature step

| temp (°C.) | comp viscosity (cps) | G' (Pa) | G" (Pa) | tan delta |
|---|---|---|---|---|
| 40.011 | 6.41E+05 | 3474.1 | 2037.9 | 0.58661 |
| 34.997 | 9.18E+05 | 5111.2 | 2674.4 | 0.52325 |
| 29.997 | 1.24E+06 | 7007.2 | 3334.9 | 0.47593 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A radiation curable phase change ink comprising:
a white colorant comprising white titanium dioxide pigment having a particle size of from about 200 to about 300 nanometers;
a colorant dispersant; and
an ink vehicle comprising at least one curable monomer; at least one gellant; optionally at least one photoinitiator; optionally at least one stabilizer; and optionally at least one wax.

2. The radiation curable phase change ink of claim 1, wherein the white colorant is a white titanium dioxide pigment present in the ink in an amount of about 10 percent by weight based upon the total weight of the ink.

3. The radiation curable phase change ink of claim 1, wherein the white colorant is a white titanium dioxide pigment present in the ink in an amount of about 20 to about 40 percent by weight based upon the total weight of the ink.

4. The radiation curable phase change ink of claim 1, wherein the dispersant is selected from copolymers and block copolymers containing pigment affinic groups, or mixtures or combinations thereof.

5. The radiation curable phase change ink of claim 1, wherein the dispersant comprises a brand of industrial copolymer.

6. The radiation curable phase change ink of claim 1, wherein the at least one curable monomer is isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, alkoxylated lauryl acrylate, ethoxylated nonyl phenol acrylate, ethoxylated nonyl phenol methacrylate, ethoxylated hydroxyethyl methacrylate, methoxy polyethylene glycol monoacrylate, methoxy polyethylene glycol monomethacrylate, tetrahydrofurfuryl methacrylate, tetrahydrofurfuryl methacrylate, or mixtures or combinations thereof.

7. The radiation curable phase change ink of claim 1, wherein the ink vehicle further comprises a multifunctional acrylate or methacrylate compound.

8. The radiation curable phase change ink of claim 7, wherein the multifunctional acrylate or methacrylate compound is pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate, hexanediol diacrylate, tripropylene glycol diacrylate, dipropylene glycol diacrylate, ethoxylated bisphenol A diacrylate, ethoxylated bisphenol A dimethacrylate, alkoxylated hexanediol diacrylate, alkoxylated cyclohexane dimethanol diacrylate, polyethylene glycol diacrylate, polyethylene glycol dimethacrylate, tris (2-hydroxy ethyl) isocyanurate triacrylate, a brand of trifunctional acrylate monomer, amine modified polyether acrylates, trimethylolpropane triacrylate, glycerol propoxylate triacrylate, dipentaerythritol pentaacrylate, dipentaerythritol hexaacrylate, ethoxylated pentaerythritol tetraacrylate or mixtures or combinations thereof.

9. The radiation curable phase change ink of claim 1, wherein the at least one gellant is a compound of the formula

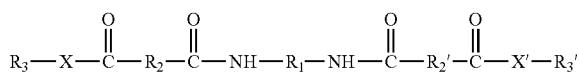

wherein $R_1$ is (i) an alkylene group, including linear and branched, saturated and unsaturated, cyclic and acyclic, and substituted and unsubstituted alkylene groups, and wherein heteroatoms either may or may not be present in the alkylene group, (ii) an arylene group, including substituted and unsubstituted arylene groups, and wherein heteroatoms either may or may not be present in the arylene group, (iii) an arylalkylene group, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) an alkylarylene group, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_2$ and $R_2'$ each, independently of the other, are (i) alkylene groups, including linear and branched, saturated and unsaturated, cyclic and acyclic, and substituted and unsubstituted alkylene groups, and wherein heteroatoms either may or may not be present in the alkylene group, (ii) arylene groups, including substituted and unsubstituted arylene groups, and wherein heteroatoms either may or may not be present in the arylene group, (iii) arylalkylene groups, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) alkylarylene groups, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_3$ and $R_3'$ each, independently of the other, are either (a) photoinitiating groups, or (b) groups which are (i) alkyl groups, including linear and branched, saturated and unsaturated, cyclic and acyclic, and substituted and unsubstituted alkyl groups, and wherein heteroatoms either may or may not be present in the alkyl group, (ii) aryl groups, including substituted and unsubstituted aryl groups, wherein heteroatoms either may or may not be present in the aryl group, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, provided that at least one of $R_3$ and $R_3'$ is a photoinitiating group, and X and X' each, independently of the other, is an oxygen atom or a group of the formula —$NR_4$—, wherein $R_4$ is (i) a hydrogen atom, (ii) an alkyl group, including linear and branched, saturated and unsaturated, cyclic and acyclic, and substituted and unsubstituted alkyl groups, and wherein heteroatoms either may or may not be present in the alkyl group, (iii) an aryl group, including substituted and unsubstituted aryl groups, and wherein heteroatoms either may or may not be present in the aryl group, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group.

10. The radiation curable phase change ink of claim 1, wherein the at least one photoinitiator is a photoinitiator selected from the group consisting of benzophenones, benzyl ketones, monomeric hydroxyl ketones, polymeric hydroxyl ketones, α-amino ketones, acyl phosphine oxides, metallocenes, benzoin ethers, benzil ketals, α-hydroxyalkylphenones, α-aminoalkylphenones, acylphosphine, isopropyl thioxanthenones, arylsulphonium salts, aryl iodonium salts and mixtures thereof.

11. The radiation curable phase change ink of claim 1, wherein the at least one gellant is a free radical curable gellant.

12. The radiation curable phase change ink of claim 1, wherein the at least one wax is a radiation curable wax.

13. The radiation curable phase change ink of claim 1, wherein the at least one wax is a free radical curable wax.

14. The radiation curable phase change ink of claim 1, wherein the at least one wax is a radiation curable wax and the at least one gellant is a compound of the formula

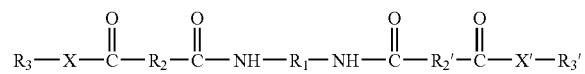

wherein $R_1$ is (i) an alkylene group, including linear and branched, saturated and unsaturated, cyclic and acyclic, and substituted and unsubstituted alkylene groups, and wherein heteroatoms either may or may not be present in the alkylene group, (ii) an arylene group, including substituted and unsubstituted arylene groups, and wherein heteroatoms either may or may not be present in the arylene group, (iii) an arylalkylene group, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) an alkylarylene group, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_2$ and $R_2'$ each, independently of the other, are (i) alkylene groups, including linear and branched, saturated and unsaturated, cyclic and acyclic, and substituted and unsubstituted alkylene groups, and wherein heteroatoms either may or may not be present in the alkylene group, (ii) arylene groups, including substituted and unsubstituted arylene groups, and wherein heteroatoms either may or may not be present in the arylene group, (iii) arylalkylene groups, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) alkylarylene groups, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_3$ and $R_3'$ each, independently of the other, are either (a) photoinitiating groups, or (b) groups which are (i) alkyl groups, including linear and branched, saturated and unsaturated, cyclic and acyclic, and substituted and unsubstituted alkyl groups, and wherein heteroatoms either may or may not be present in the alkyl group, (ii) aryl groups, including substituted and unsubstituted aryl groups, wherein heteroatoms either may or may not be present in the aryl group, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, provided that at least one of $R_3$ and $R_3'$ is a photoinitiating group, and X and X' each, independently of the other, is an oxygen atom or a group of the formula —$NR_4$—, wherein $R_4$ is (i) a hydrogen atom, (ii) an alkyl group, including linear and branched, saturated and unsaturated, cyclic and acyclic, and substituted and unsubstituted alkyl groups, and wherein heteroatoms either may or may not be present in the alkyl group, (iii) an aryl group, including substituted and unsubstituted aryl groups, and wherein heteroatoms either may or may not be present in the aryl group, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group.

15. The radiation curable phase change ink of claim 1, wherein the ink has a viscosity of greater than about $10^4$ to about $10^7$ centipoise at a temperature range of from about 15° C. to about 50° C.

16. The radiation curable phase change ink of claim 1, wherein the ink has a viscosity of greater than about $10^5$ centipoise at a temperature of less than about 40 ° C.

17. The radiation curable phase change ink of claim 1, wherein the ink has a viscosity of greater than about 2 to about 22 centipoise at a temperature range of from about 70° C. to about 95° C.

18. The radiation curable phase change ink of claim 1, wherein the ink has a viscosity of less than about 15 centipoise at a temperature of greater than about 70 ° C.

19. A process which comprises (I) incorporating into an ink jet printing apparatus radiation curable phase change ink comprising a white colorant comprising white titanium dioxide pigment having a particle size of from about 200 to about 300 nanometers; a colorant dispersant; and an ink vehicle comprising at least one curable monomer; at least one gellant; optionally at least one photoinitiator; optionally at least one stabilizer; and optionally at least one wax; (II) melting the ink; (III) causing droplets of the melted ink to be ejected in an imagewise pattern onto a substrate; and (IV) exposing the imagewise pattern to ultraviolet radiation.

20. A process according to claim 19 wherein the substrate is a final recording sheet and droplets of the melted ink are ejected in an imagewise pattern directly onto the final recording sheet and the imagewise pattern on the final recording sheet is exposed to ultraviolet radiation.

21. A process according to claim 19 wherein the substrate is an intermediate transfer member and droplets of the melted ink are ejected in an imagewise pattern onto the intermediate transfer member followed by transfer of the imagewise pattern from the intermediate transfer member to a final recording sheet, and wherein the imagewise pattern on the final recording sheet is exposed to ultraviolet radiation.

22. A process according to claim 21 wherein the intermediate transfer member is heated to a temperature above that of the final recording sheet and below that of the melted ink in the printing apparatus.

* * * * *